(12) United States Patent
Pettey

(10) Patent No.: US 7,501,731 B2
(45) Date of Patent: Mar. 10, 2009

(54) APPARATUS FOR ENHANCING HOBBY SERVO PERFORMANCE

(75) Inventor: Brian Pettey, Winfield, KS (US)

(73) Assignee: BTR Robotics Limited Liability Company, Winfield, KS (US)

(*) Notice: Subject to any disclaimer, the term of this patent is extended or adjusted under 35 U.S.C. 154(b) by 408 days.

(21) Appl. No.: 11/370,593

(22) Filed: Mar. 8, 2006

(65) Prior Publication Data

US 2006/0213319 A1 Sep. 28, 2006

Related U.S. Application Data

(60) Provisional application No. 60/659,941, filed on Mar. 9, 2005.

(51) Int. Cl.
*H02K 5/00* (2006.01)

(52) U.S. Cl. ..................... 310/75 R; 310/91

(58) Field of Classification Search .......... 310/75 R, 310/91; 74/89.22, 96, 522; 244/17.19, 99.2
See application file for complete search history.

(56) References Cited

U.S. PATENT DOCUMENTS

| 3,735,164 A | * | 5/1973 | Linn et al. ............... 310/41 |
| 4,081,705 A | * | 3/1978 | Johnson .................. 310/90 |
| 4,429,204 A | * | 1/1984 | McGuire et al. ........... 219/751 |
| 5,492,024 A | * | 2/1996 | Siner ..................... 74/89.22 |
| 7,270,589 B1 | * | 9/2007 | Brown et al. .............. 446/317 |

FOREIGN PATENT DOCUMENTS

JP 06038457 A * 2/1994

OTHER PUBLICATIONS

Anderson, D.; "Improving Servo Positioning Accuracy," http://www.seattlerobotics.org/encoder/200010/servohac.html pp. 1-9.
Anderson, D.; "Improving Servo Positioning Accuracy," http://web.archive.org/web/*/http://www.geology.smu.edu/~dpa-www. pp. 1-8.
Wheat, D.; "Hacking the Tower Hobbies TS-53 Servo," DPRG: http://web.archive.org/web/20040623092815/dprg.org/projects/2003-05a/, May 9, 2003, pp. 1-7.
Brown, J.; "Sub Micro Servo Motor Hack," DPRG http://web.archive.org/web/20040622205626/dprg.org/projects/1998-04b/ Apr. 1998, pp. 1-11.
Anderson, D. "Improving Servo Positioning Accuracy," DPRG, http://www.dprg.org/projects/2000-09a/?, Sep. 19, 2000. pp. 1-5.

* cited by examiner

*Primary Examiner*—Tran N Nguyen
(74) *Attorney, Agent, or Firm*—Westman, Champlin & Kelly, P.A.

(57) ABSTRACT

An apparatus is disclosed for enhancing the operation performance of a servo. The apparatus comprises a rotational enhancement mechanism configured to functionally engage an output shaft associated with the hobby servo and a support panel displaced from the servo and having a aperture formed therein for receiving the rotational enhancement mechanism.

6 Claims, 3 Drawing Sheets

APPARATUS FOR ENHANCING HOBBY SERVO PERFORMANCE

The present application is based on and claims the benefit of U.S. Provisional Patent Application Ser. No. 60/659,941, filed on Mar. 9, 2005, the content of which is hereby incorporated by reference in its entirety.

BACKGROUND OF THE INVENTION

The present invention generally pertains to the hobby-mechanical industry. More specifically, the present invention pertains to means for improving the mechanical capacity of a hobby servo.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servo motors that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos. Because hobby servos are relatively small and inexpensive, they are popular within the hobby-mechanical industry for applications such as, but not limited to, hobby robotic applications and radio-controlled models (cars, planes, boats, etc.). One example of a hobby servo is the Futaba S-148 available from Futaba Corporation of America located in Schaumburg, Ill.

Another restriction associated with hobby servos, or servos in general, is a lack of mechanical capacity. Servos are used in a variety of applications, some of which consist of applying heavy loads to the output shaft. In many cases, in addition to rotational loads, lateral forces which are perpendicular to the output shaft may be applied. Some loads which may be within the rotational capacity of the servo output shaft may nonetheless applying lateral forces exceeding the strength of the output shaft. In some cases, damage such as shaft distortion or breakage may result. As such, there is a need for means to improve the mechanical capacity and durability associated with hobby servos.

SUMMARY OF THE INVENTION

Embodiments of an apparatus are disclosed for enhancing the operational performance of a servo motor. Embodiments include an apparatus for enhancing the operational performance of a hobby servo comprising a rotational enhancement mechanism configured to functionally engage an output shaft associated with the hobby servo and a support panel displaced from the servo and having an aperture formed therein for receiving the rotational enhancement mechanism.

DETAILED DESCRIPTION OF ILLUSTRATIVE EMBODIMENTS

Figure 1:
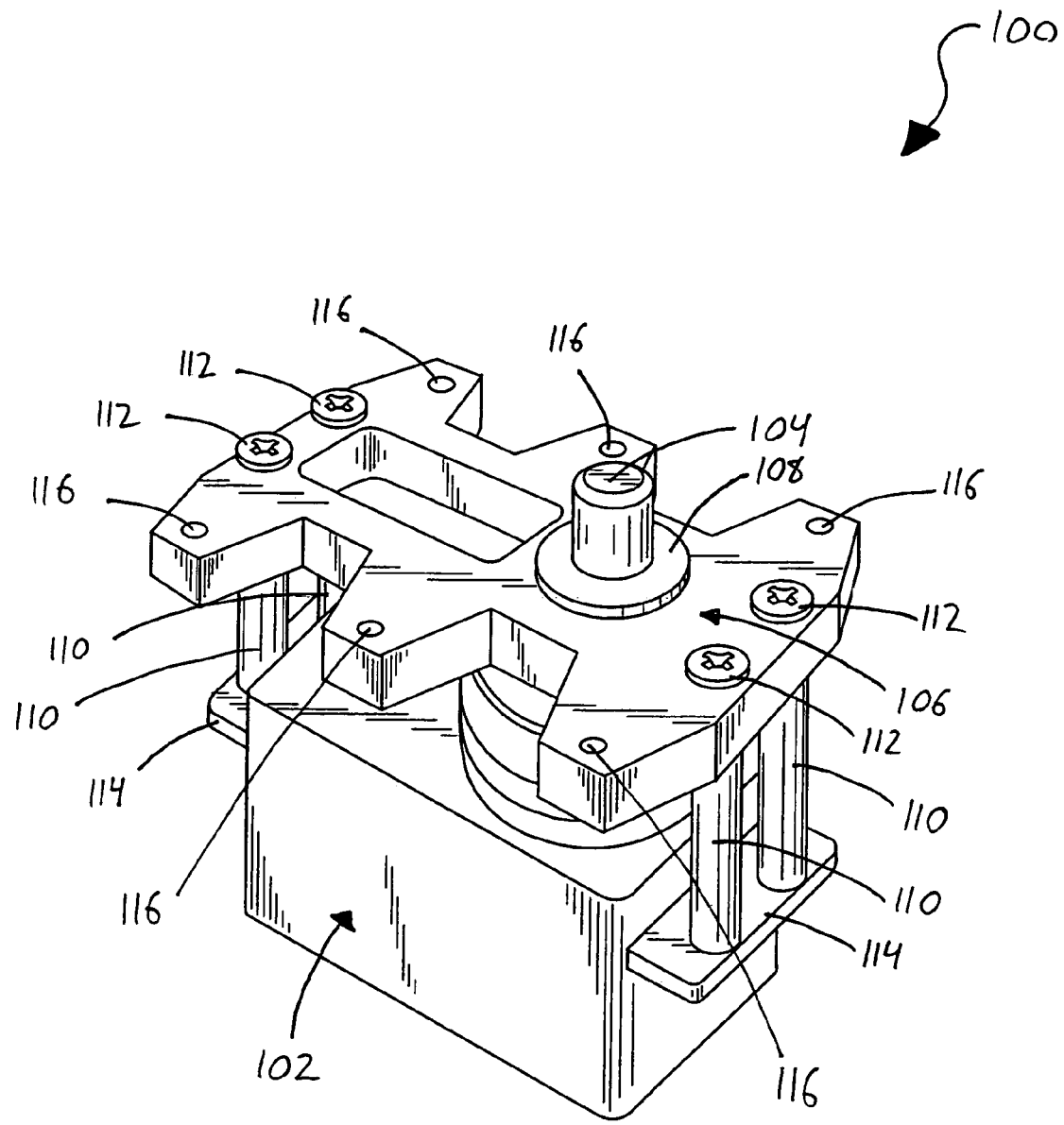
FIG. 1 is a perspective side view of an apparatus for enhancing the operational performance of a hobby servo.

FIG. 1 is a perspective side view of an apparatus 100 for enchaning the mechanical capacity of a servo 102. Apparatus 100 comprises a frame 106 mounted to servo 102 using spacers 110. In accordance with one aspect of the present invention, spacers 110 are secured such that they form a substantially rigid connection between frame 106 and servo 102. In this manner, frame 106 has relatively limited movement with respect to servo 102. Securing spacers 110 is described in detail below.

Figure 2:
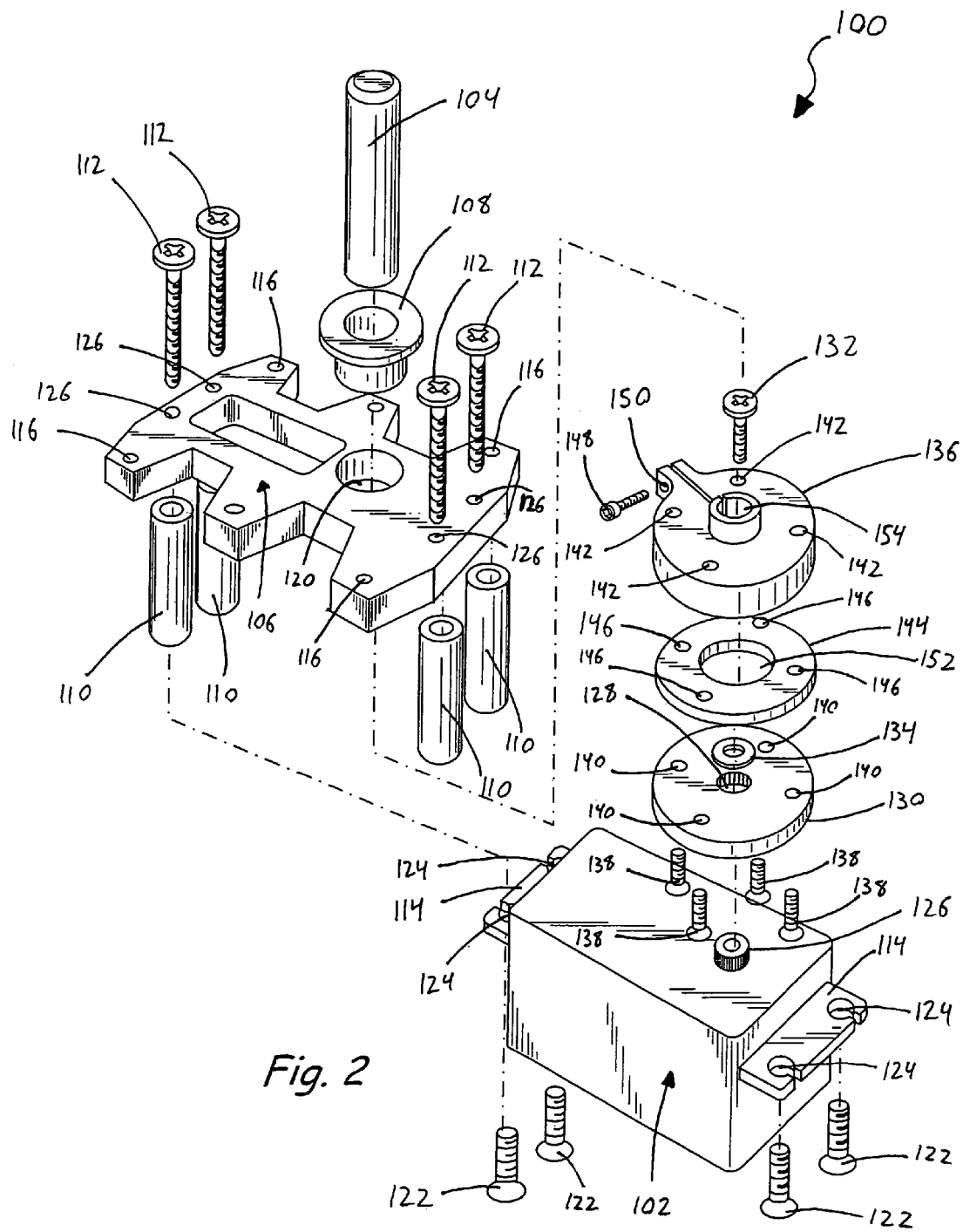
FIG. 2 is an exploded perspective side view of the apparatus of FIG. 1.

Auxiliary shaft 104 is rotatably engaged to servo 102 and is supported by frame 106 through the use of bushing 108 engaged to aperture 120 (shown in FIG. 2). The support of auxiliary shaft 104 by frame 106, coupled with the substantially rigid connection between servo 102 and frame 106, allows for the substantial absorption of forces applied perpendicular to auxiliary shaft 104. As a result, auxiliary shaft 104 may withstand greater forces before damage or breakage occurs.

In accordance with another aspect of the present invention, frame 106 comprises mounting apertures 116 for securing apparatus 100 in an operating environment. In one embodiment, attachment mechanisms are inserted through apertures 116 and fastened to corresponding apertures in the operating environment. Attachment mechanisms may include screws, bolts, clips, nails, rivets, or any other means for securing apparatus 100. It is important to note that other attachment schemes may be utilized to secure apparatus 100 without departing from the scope of the present invention.

FIG. 2 is an exploded perspective side view of apparatus 100. In accordance with one aspect of the present invention, a spline receiver 128 is configured to engage servo output spline 126. As is typically of some hobby servos, servo output spline 126 comprises a series of gear teeth. In other embodiments, servo output spline 126 can comprise engagement configurations other than gear teeth. In such embodiments, spline receiver 128 can be modified accordingly to accommodate output spline 126.

Figure 3:
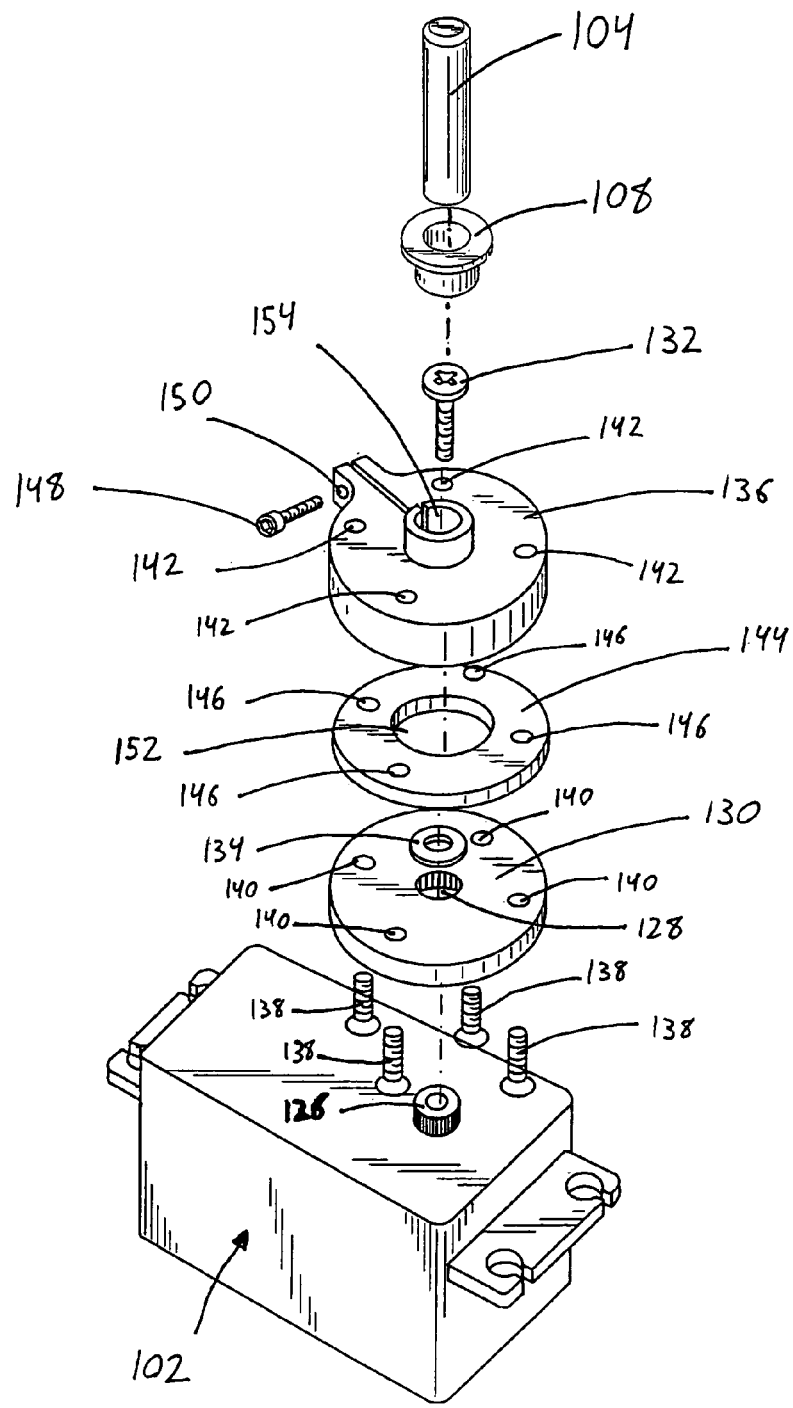
FIG. 3 is an exploded perspective side view of a rotational enhancement mechanism.

As illustrated in FIG. 3, servo output spline 126 includes a plurality of gear teeth disposed around the outer edge perimeter. Female spline receiver 128 consists of an aperture formed through the approximate center axis of a spline mount plate 130 and is configured to engage servo output spline 126. Spline receiver 128 is, illustratively, an aperture having a series of teeth formed around the perimeter configured to engage a corresponding set of teeth formed on servo spline 126. Spline mount plate 130 may be varied depending upon which spline receiver 128 configuration is needed to accommodate a given spline 126. While it is common for servo spline 126 to have a 23, 24 or 25 tooth configuration, any other spline configuration is within the scope of the present invention. In other embodiments, a different spline mount plate 130 can be utilized depending upon which spline receiver 128 configuration is needed to accommodate a given spline 126. In other embodiments, a specialized spline receiver 128 configuration is provided to accommodate attachment to multiple spline 126 configurations. It should be noted that spline receiver 128 configurations other than those suitable for 23, 24 or 25 tooth configurations are within the scope of the present invention. For example, output spline 126 can comprise less than 23 gear teeth. In other embodiments, output spline can comprise more than 25 gear teeth. Spline receiver 128 can be configured in any number of ways based on the configuration of servo output spline 126.

In addition to varied tooth configurations, the size of servo output spline can also vary depending upon, for example, the choice of hobby servo 102. In one embodiment, the diameter across the hobby servo output spline 126 from its furthest points is exactly 6 millimeters. In another embodiment, the diameter across the hobby servo output spline 126 from its furthest points is approximately 6 millimeters. In another embodiment, the diameter across the hobby servo output spline 126 from its furthest points is less than 10 millimeters. In another embodiment, the diameter across the hobby servo output spline 126 from its furthest points is more than 10 millimeters. Any size hobby servo output spline is within the scope of the present invention. It is important to note that female spline receiver 128 can vary depending upon servo output spline 126 tooth configuration and/or diameter.

Mount plate 130 is engaged to output spline 126 using an attachment mechanism 132, such as a screw, which is inserted through the center axis of a washer 134 and into the center axis of spline 126. Shaft hub 136 is further affixed to spline mount plate 130 using attachment mechanisms 138 inserted through spline mount apertures 140 at the surface of spline mount plate 130 proximate to servo 102. Attachment mechanisms 138 are secured to shaft hub 136 through hub apertures 142. In one embodiment of the present invention, a spacer 144, having an overall diameter similar to that of spline mount plate 130, is affixed between the adjoining surfaces of shaft hub 136 and spline mount plate 130 and is secured by attachment mechanisms 138 inserted though apertures 146. It is important to note that other attachment schemes are within the scope of the present invention.

In accordance with another aspect of the present invention, as was mentioned above, spacers 110 are used to secure frame 106 to servo 102. Servo 102 includes attachment flanges 114 having apertures 124 formed therein as is typical of most hobby servos. Apertures 124 are aligned with openings formed in spacers 110, and attachment mechanisms 122 are inserted through apertures 124 thereby securing spacers 110 to servo 102. The distal ends of spacers 110 are further connected to frame 106 by attachment mechanisms 112 inserted through frame apertures 126. In accordance with one aspect of the present invention, spacers 110 are configured to extend slightly beyond the top edge of shaft hub 136 such that frame 106, when mounted to spacers 110, is in close proximity to the top of shaft hub 136.

In accordance with another aspect of the present invention, shaft bushing 108 can be inserted into aperture 120 formed in frame 106 such that the larger diameter of bushing 108 engages the top surface of frame 106.

FIG. 3 illustrates a portion of apparatus 100. Rotational enhancement mechanism 300 includes all components shown in FIG. 3 except servo 102. Further, some of the components illustrated in FIG. 3, such as bushing 108 and spacer 144, are optional within rotational enhancement mechanism 300. As illustrated in FIG. 3, rotational enhancement mechanism 300 includes an auxiliary shaft 104 inserted through optional shaft bushing 108 and into the aperture 154 formed in shaft hub 136. In one embodiment, auxiliary shaft 104 extends beyond shaft hub 136 and into the aperture 152 formed in spacer 144.

As described with regard to FIG. 2, rotational enhancement mechanism 300 includes an aperture 128 having teeth formed around the inner perimeter surface configured to engage a corresponding set of teeth on servo output shaft 126. In another embodiment, screw 132 is utilized to secure rotational enhancement mechanism 300 to output spline 126.

In accordance with one embodiment of the present invention, mount plate 130 having aperture 128 formed therein is attached to a shaft hub 136. Further, auxiliary shaft 104 is secured within shaft hub 136 such that rotation of hub 136 is translated to auxiliary shaft 104. In one embodiment, shaft hub 136 includes an adjustable diameter determined by the position of adjustment mechanism 148 within hub aperture 150. Thus, adjustment mechanism 148 can be used to tighten shaft hub 136 thereby securing auxiliary shaft 104 within hub 136. Of course, other attachment schemes may be utilized and are within the scope of the present invention.

In accordance with another aspect of the present invention, auxiliary shaft 104 may be utilized to drive a mechanical load. Examples include, but are not limited to, gears, sprockets, chains, rotatable arms, or any other device. As was mentioned above, some mechanical applications require a servo having a greater axial shaft strength than that typically associated with a hobby servo. The present invention pertains to simple and inexpensive enhancements for hobby servos that are capable of improving the mechanical capacity of the output shaft.

Although the present invention has been described with reference to preferred embodiments, workers skilled in the art will recognize that changes may be made in form and detail without departing from the spirit and scope of the invention.

What is claimed is:

1. An apparatus for enhancing the operational performance of a hobby servo, comprising:
   a rotational enhancement mechanism configured to functionally engage an output shaft associated with the hobby servo;
   a support panel displaced from the servo and having an aperture formed therein for receiving the rotational enhancement mechanism;
   wherein the rotational enhancement mechanism comprises a spline mount plate configured to functionally engage a hobby servo output spline having gear teeth; and
   wherein the rotational enhancement mechanism comprises a shaft hub attached to the mount plate and configured to receive an auxiliary shaft.

2. The apparatus of claim 1 wherein the rotational enhancement mechanism comprises an auxiliary shaft and wherein the aperture formed in the support panel is configured to receive the auxiliary shaft.

3. The apparatus of claim 2 wherein the rotational enhancement mechanism further comprises a bushing positioned within the aperture and configured to receive the auxiliary shaft.

4. The apparatus of claim 1 and further comprising at least one spacer positioned between the support panel and the hobby servo.

5. The apparatus of claim 1 wherein the spline mount plate is configured to functionally engage a hobby servo output spline having more than twenty gear teeth.

6. The apparatus of claim 1 wherein the spline mount plate is configured to functionally engage a hobby servo output spline that has a gear teeth configuration selected from a set of configurations that includes a twenty-three tooth configuration, a twenty-four tooth configuration, and a twenty-five tooth configuration.

* * * * *